United States Patent
Bekooij et al.

(10) Patent No.: US 6,438,568 B1
(45) Date of Patent: Aug. 20, 2002

(54) METHOD AND APPARATUS FOR OPTIMIZING CONVERSION OF INPUT DATA TO OUTPUT DATA

(75) Inventors: Marco J. G. Bekooij; Paulus W. F. Gruijters, both of Eindhoven (NL)

(73) Assignee: Koninklijke Philips Electronics N.V., New York, NY (US)

( * ) Notice: Subject to any disclaimer, the term of this patent is extended or adjusted under 35 U.S.C. 154(b) by 0 days.

(21) Appl. No.: 09/287,162

(22) Filed: Apr. 6, 1999

(30) Foreign Application Priority Data

Apr. 9, 1998 (EP) .............................. 98201099

(51) Int. Cl.[7] .............................. G06F 17/14
(52) U.S. Cl. .............................. 708/409
(58) Field of Search .............................. 708/409, 408, 708/405, 404, 403

(56) References Cited

U.S. PATENT DOCUMENTS

| | | | |
|---|---|---|---|
| 4,393,457 A | 7/1983 | New | 708/404 |
| 4,491,910 A | 1/1985 | Caudel et al. | 712/42 |
| 4,689,762 A * | 8/1987 | Thibodeau, Jr. | 708/409 |
| 5,546,569 A * | 8/1996 | Proebsting et al. | 395/550 |
| 5,845,093 A * | 12/1998 | Fleming | 708/409 |
| 5,890,098 A * | 3/1999 | Kozaki et al. | 708/409 |
| 6,058,409 A * | 5/2000 | Kozaki et al. | 708/409 |

OTHER PUBLICATIONS

"Theory and Application of Digital Signal Processing", by Lawerence R. Rabiner and Bernard Gold. paragraph 10.10.

* cited by examiner

Primary Examiner—David H. Malzahn
(74) Attorney, Agent, or Firm—Steven R. Biren

(57) ABSTRACT

The device for converting series of input data elements to series of output data elements is provided with a memory (110) for containing the series of input and output data elements. This memory (110) is embodied so as to successively read a series of input data elements and write a series of output data elements during a single clock cycle.

13 Claims, 5 Drawing Sheets

| 0 | 1 | 2 | 3 | 1 |
|---|---|---|---|---|
| 4 | 5 | 6 | 7 | 2 |
| 8 | 9 | 10 | 11 | 3 |
| 12 | 13 | 14 | 15 | 4 |
| 16 | 17 | 18 | 19 | 5 |
| 20 | 21 | 22 | 23 | 6 |
| 24 | 25 | 26 | 27 | 7 |
| 28 | 29 | 30 | 31 | 8 |

150

| 24 | 26 | 28 | 30 | 4 |
|---|---|---|---|---|
| 25 | 27 | 29 | 31 | 8 |
| 0 | 2 | 4 | 6 | 1 |
| 1 | 3 | 5 | 7 | 5 |
| 8 | 10 | 12 | 14 | 2 |
| 9 | 11 | 13 | 15 | 6 |
| 16 | 18 | 20 | 22 | 3 |
| 17 | 19 | 21 | 23 | 7 |

160

| 2 | 6 | 10 | 14 | 5 |
|---|---|---|---|---|
| 3 | 7 | 11 | 15 | 7 |
| 16 | 20 | 24 | 28 | 2 |
| 17 | 21 | 25 | 29 | 4 |
| 18 | 22 | 26 | 30 | 6 |
| 19 | 23 | 27 | 31 | 8 |
| 0 | 4 | 8 | 12 | 1 |
| 1 | 5 | 9 | 13 | 3 |

170

| 2 | 10 | 18 | 26 | 3 |
|---|---|---|---|---|
| 3 | 11 | 19 | 27 | 4 |
| 4 | 12 | 20 | 28 | 5 |
| 5 | 13 | 21 | 29 | 6 |
| 6 | 14 | 22 | 30 | 7 |
| 7 | 15 | 23 | 31 | 8 |
| 0 | 8 | 16 | 24 | 1 |
| 1 | 9 | 17 | 25 | 2 |

180

| 0 | 16 | 1 | 17 | 1 |
|---|---|---|---|---|
| 8 | 24 | 9 | 25 | 5 |
| 2 | 18 | 3 | 19 | 2 |
| 10 | 26 | 11 | 27 | 6 |
| 4 | 20 | 5 | 21 | 3 |
| 12 | 28 | 13 | 29 | 7 |
| 6 | 22 | 7 | 23 | 4 |
| 14 | 30 | 15 | 31 | 8 |

190

| 4 | 5 | 6 | 7 |
|---|---|---|---|
| 12 | 13 | 14 | 15 |
| 20 | 21 | 22 | 23 |
| 28 | 29 | 30 | 31 |
| 0 | 1 | 2 | 3 |
| 8 | 9 | 10 | 11 |
| 16 | 17 | 18 | 19 |
| 24 | 25 | 26 | 27 |

METHOD AND APPARATUS FOR OPTIMIZING CONVERSION OF INPUT DATA TO OUTPUT DATA

The invention relates to a device for converting series of input data elements to series of output data elements, the device being provided with a memory means for containing the series of input and output data elements.

Such a device is known from paragraph 10.10 in the book entitled "Theory and application of digital signal processing" by the authors Lawrence R. Rabiner and Bernard Gold. In digital signal processing the discrete Fourier transform (DFT) plays an important part. By means of this transform, a description of a signal in the time domain can be converted to a description of the same signal in the frequency domain. This has the advantage that subsequently specific signal processing operations, which can only be performed in a very complex manner in the time domain, can be performed in a relatively simple manner.

Since performing a DFT requires very many arithmetical processes, through the years many devices have been designed by means of which a DFT can be calculated rapidly and efficiently. Often these devices are provided with a number of so-called butterflies, which are capable of rapidly performing specific sub-processes necessary for the DFT. In such a butterfly, a number of input data elements are converted to an equally large number of output data elements by doing additions and multiplications, said multiplications being performed by means of a multiplying factor. These multiplication factors are alternatively referred to as twiddle factors or $W_N^k$.

The device mentioned in said book is provided with a RAM-memory, a butterfly and a permutation network. The RAM-memory is embodied so that each memory word can contain a series of data elements, the number of data elements in the series being equal to the number of data elements which can be converted by the butterfly. If, for example, in the known device a radix-4 butterfly is employed, that is a butterfly capable of converting four input data elements to four output data elements, then the RAM-memory is organized so that each memory word can contain a series of four data elements.

From the RAM-memory, a series of all necessary input data elements is supplied to the butterfly by reading a memory word. In the butterfly, these input data elements are converted to output data elements. The multiplication factors necessary for this purpose are read from a ROM-memory. Subsequently, in the permutation network, these output data elements and other output data elements computed by the butterfly are distributed over a number of series of output data elements. These series of output data elements are finally written in the RAM-memory and can be used at a later stage as series of input data elements. By repeatedly performing a radix-B butterfly, in which the output data elements of the butterfly serve in a different order as input data elements for the butterfly, an N-point DFT can be calculated, B being smaller than N. In this manner, for example, a 32-point DFT can be calculated by means of a radix-4 butterfly.

The known device is relatively slow.

It is an object of the invention to provide a device of the type mentioned in the opening paragraph, which is capable of performing the operation of converting the series of input data elements to series of output data elements more rapidly.

To achieve this, the device in accordance with the invention is characterized in that the memory means is embodied so as to read a series of input data elements and write a series of output data elements during a single clock cycle. During the calculation of an N-point DFT, frequently series of input data elements must be read from the memory means and series of output data elements must be written in the memory means. Generally, this takes up one clock cycle for each read or write operation. By embodying the memory means so that during a single clock cycle both a series of input data elements can be read and a series of output data elements can be written, for example by providing the memory means with a so-called read-modify-write function, the access to the memory means is accelerated. This has the additional advantage that the device consumes less energy.

An embodiment of the device in accordance with the invention is characterized in that an order in which the series of input data elements are converted to series of output data elements is selected so that multiplication factors required in the butterfly remain constant for as long as possible. If these multiplication factors are stored in a memory, it is achieved by means of this measure that the device has to read a multiplication factor from the memory only a minimum number of times. If, however, the multiplication factors have to be computed by the device, it is achieved by this measure that the device has to compute a multiplication factor only a minimum number of times. In either case, this may lead to a reduced energy consumption by the device and an increase of the speed with which the device converts input data elements to output data elements.

A further embodiment of the device in accordance with the invention is characterized in that the device comprises at least a Viterbi butterfly. The way in which a DFT is computed has many similarities to the way in which a so-called Viterbi decoding algorithm is computed. By using at least one Viterbi butterfly, the device in accordance with the invention can also suitably be used to realize a Viterbi decoder.

Another embodiment of the device in accordance with the invention is characterized in that an order in which the series of input data elements are converted to series of output data elements is chosen so that writing a series of output data elements after reading a necessary series of input data elements occurs as much as possible. By choosing the order in which the series of input data elements are converted to series of output data elements to be such that reading a series of input data elements and writing a series of output data elements during a single clock cycle occurs as much as possible, it is achieved that the memory means must be accessed a minimum number of times. This measure too can lead to a reduction of the energy consumption by the device and an increase of the speed with which the device converts input data elements to output data elements.

These and other aspects of the invention will be apparent from and elucidated with reference to the embodiments described hereinafter.

In the drawings:

FIGS. 4 and 5 show a number of diagrams, which will be used to explain the operation of the device in accordance with the invention.

Figure 1:
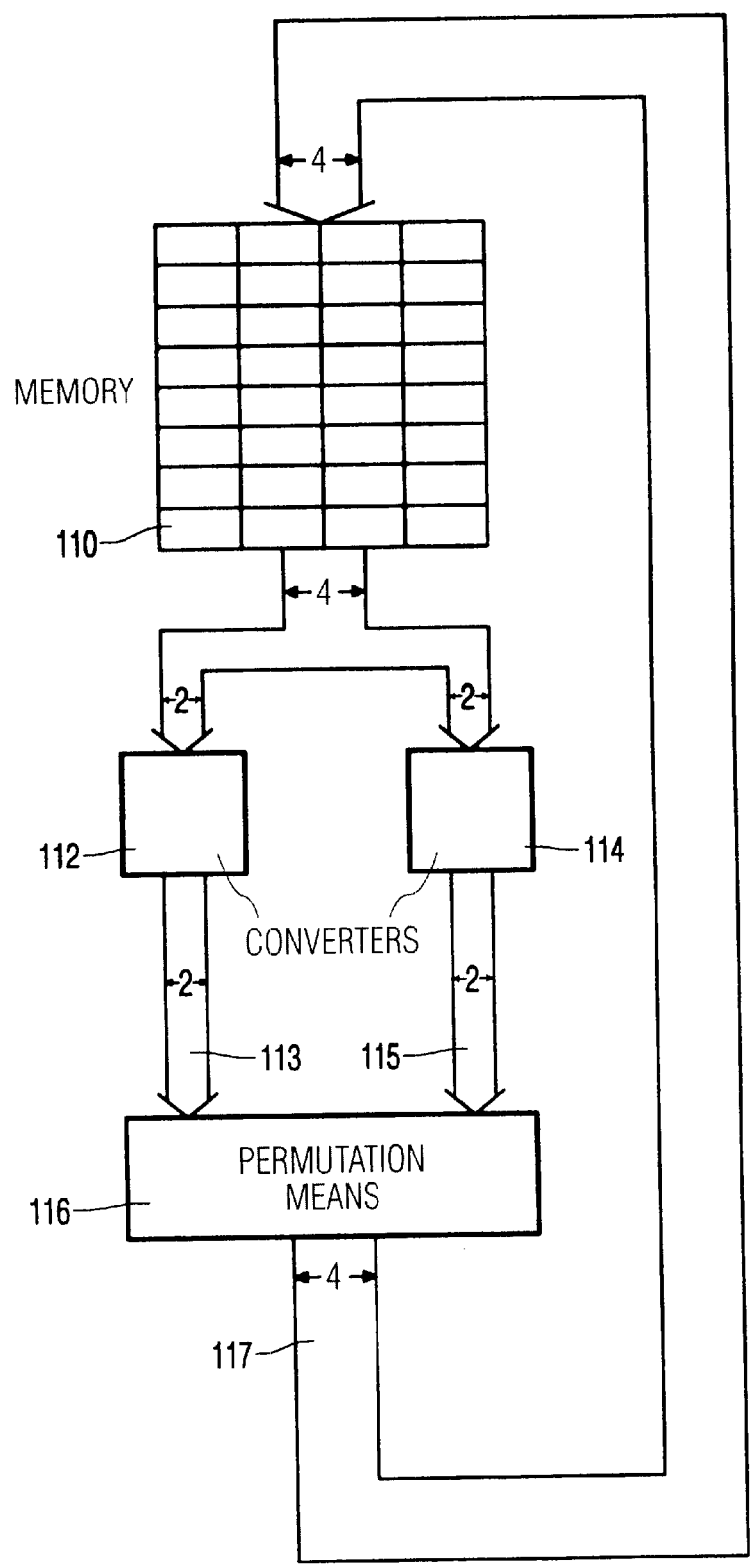
FIG. 1 shows a block diagram of an example of a device in accordance with the invention.

The device shown in FIG. 1 can suitably be used to convert series of input data elements to series of output data elements. For this purpose, the device includes a memory means 110, which may be embodied so as to be, for example, a RAM-memory, in which these series of data elements can be stored. In this example, the memory means 110 may comprise eight series of four data elements. The device is further provided with two converters 112 and 114 which are arranged so as to extend parallel to each other, each of which is capable of converting two input data elements to two output data elements. A series of four input data elements read from the memory means 110 is divided by the device into two groups of two input data elements. These groups of input data elements are subsequently simultaneously converted in the converters 112 and 114 to two groups 113 and 115 of two output data elements. These output data elements are stored in the permutation network 116 until a subsequent series of four input data elements read from the memory means 110 is converted by the device in the manner just described to two new groups 113 and 115 of two output data elements. In the permutation network 116, these latest output data elements and the output data elements already stored therein are divided into two series of four data elements in such a manner that these series of output data elements can be subsequently used again as series of input data elements. The series of output data elements composed in the permutation network are finally written in the memory means 110.

Figure 3:
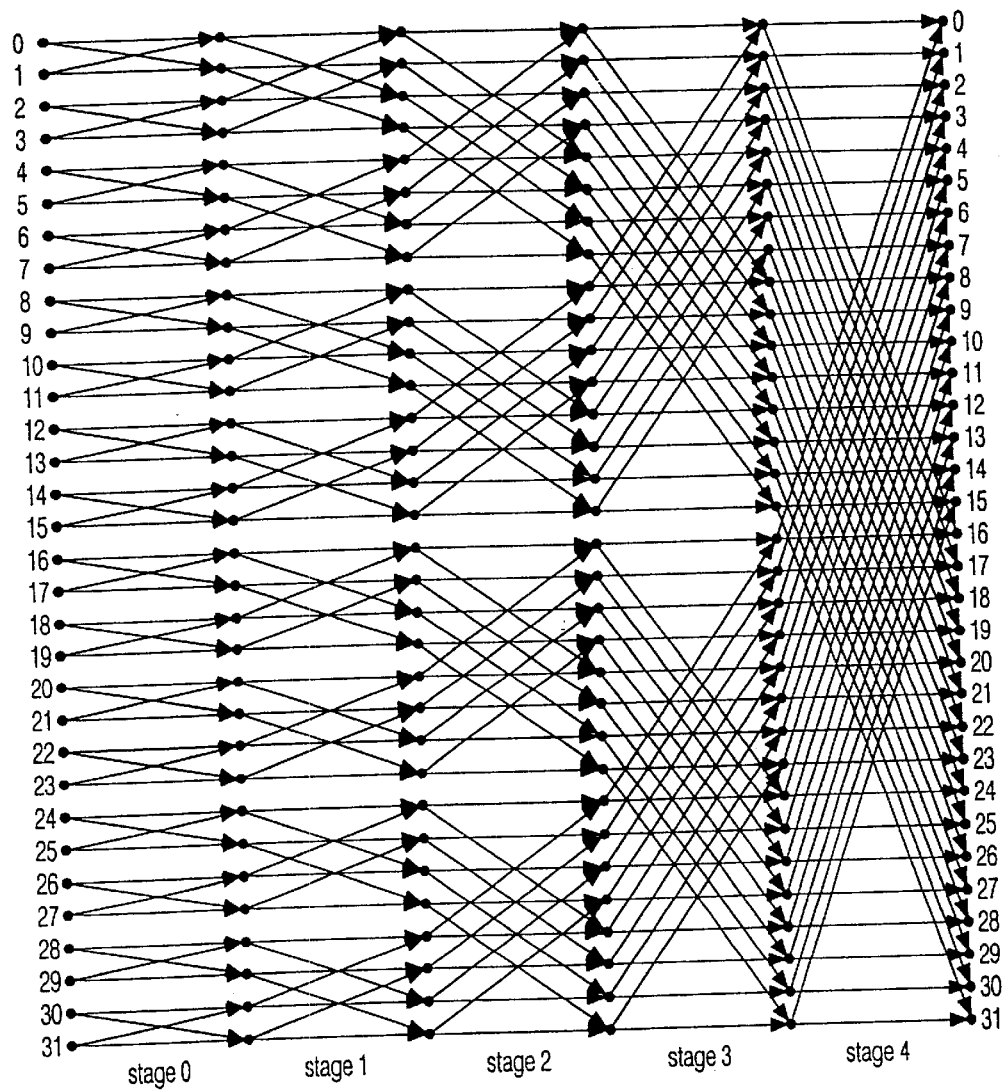
FIG. 3 shows a data flow graph of a 32-point discrete Fourier transform, which is used to explain the operation of the device in accordance with the invention.

By means of the device shown, a number of input data elements can be rapidly and efficiently processed, whereby it is necessary to repeatedly convert groups of input data elements to groups of output data elements. Such processing operations can be represented by means of so-called data flow graphs. By way of example, FIG. 3 shows a data flow graph in which each time a group of two input data elements is converted to a group of two output data elements, said input and output data elements being indicated by the same reference numerals. The data flow graph shown is divided into a number of successive stages. First, a stage 0 is performed, subsequently stage 1, etc., up to and including stage 4. For each stage, the data flow graph indicates which groups of two input data elements are converted to groups of two output data elements. For example, in stage 0 input data elements 0 and 1 are converted to output data elements 0 and 1, input data elements 2 and 3 are converted to output data elements 2 and 3, etc. The relative order of these conversions within a stage is not important. The output data elements produced in a stage are used as input data elements in the next stage. For example, the output data elements 0 and 2 produced in stage 0 are converted, in stage 1, as input data elements to output data elements 0 and 2.

It is known that such a data flow graph can be used to describe a DFT-algorithm or a Viterbi decoding algorithm. The data flow graph shown in FIG. 3 can be interpreted as a 32-point radix-2 DFT-algorithm, whereby the input data elements are bit-reversed and the output data elements are linearly ordered. If this algorithm is to be carried out by the device shown in FIG. 1, the converters 112 and 114 must include radix-2 Fourier transform butterflies. These butterflies may be of the Decimation-In-Time type (DIT) or of the Decimation-In-Frequency type (DIF). In the case of a radix-2 DIT-butterfly, two input data elements A and B are converted to two output data elements X and Y, whereby it applies that $X=A+B \cdot W_N^k$ and $Y=A-B \cdot W_N^k$. In the case of a radix-2 DIF-butterfly, the relation between the input and output data elements is given by $X=A+B$ and $Y=(A-B) \cdot W_N^k$. Another difference between these two types of Fourier transform butterflies is that in the DIT-butterflies other multiplication factors $W_N^k$ are necessary than in the DIF-butterflies. Hereinafter, it will always be assumed that DIT butterflies are used. The multiplication factors necessary for these butterflies can be computed by the device or, for example, read from a ROM-memory. If the device shown in FIG. 1 is used to carry out a Viterbi decoding algorithm, the converters 112 and 114 must include radix-2 Viterbi butterflies. These Viterbi butterflies are also referred to as add-compare-select units. The device in accordance with the invention may also be used with other radices and with another number of converters. For example, four radix-2 converters can be used to carry out a radix-2 algorithm. It is alternatively possible to apply radix-4 converters in the device in accordance with the invention to carry out a radix-4 algorithm. In addition, the device in accordance with the invention may also be provided with only a single converter.

It will be clear that before the device can start carrying out one of the above-mentioned algorithms, the memory means 110 has to be filled in some way with the necessary initial input data elements. When the algorithm has been carried out, the results can be read from the memory means 110 in the form of output data elements.

When one of the above-mentioned algorithms is being carried out by the device, series of input data elements must frequently be read from the memory means 110 and series of output data elements must frequently be written in the memory means 110. Generally, this takes up one clock cycle per read or write operation. By embodying the memory means 110 so that during a single clock cycle both a series of input data elements can be read and a series of output data elements must frequently be written, the access to the memory means 110 is accelerated. This has the additional advantage that the device has a lower power consumption.

Figure 2:
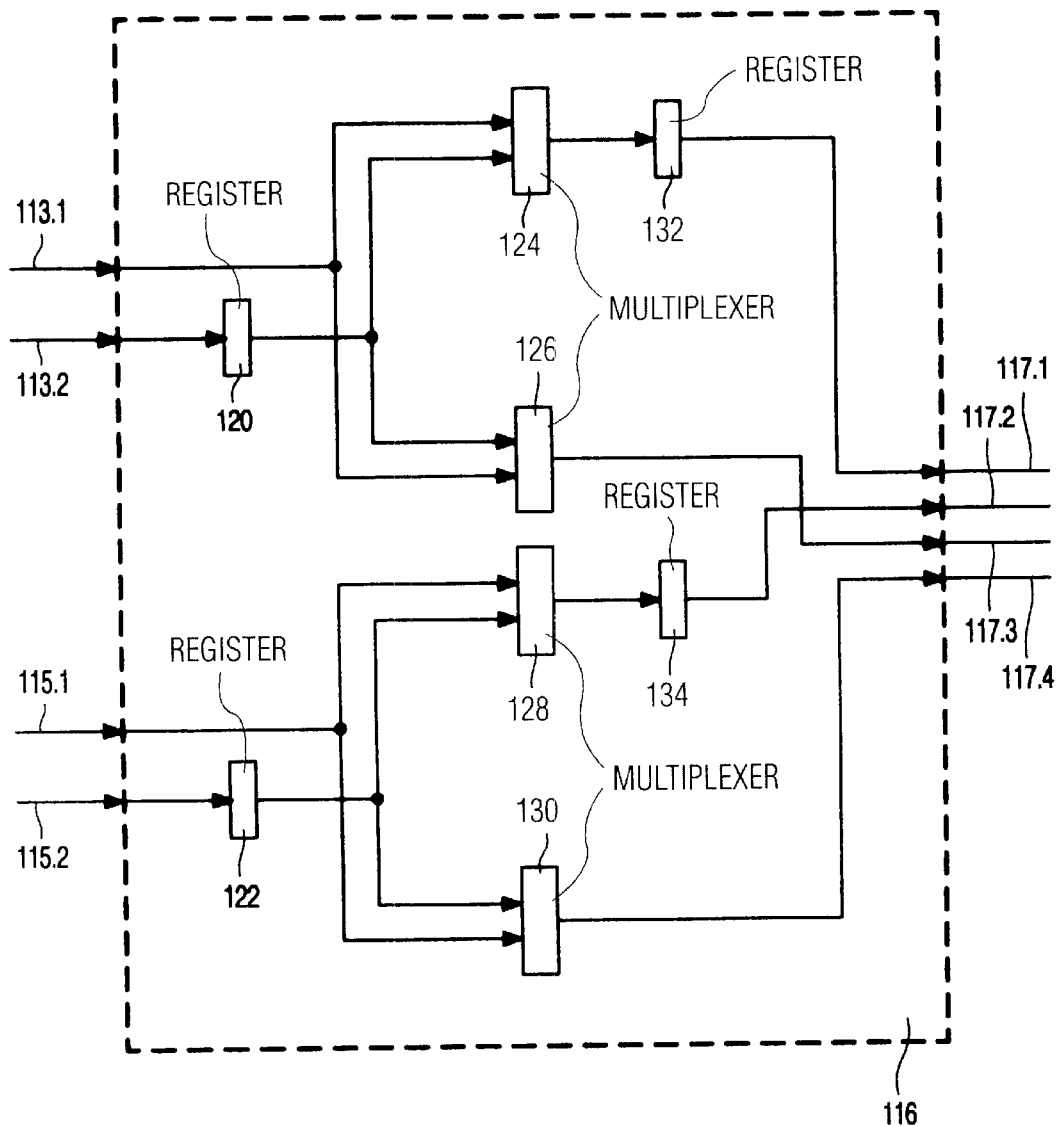
FIG. 2 shows a block diagram of a permutation network for use in a device in accordance with the invention.

The permutation network 116 shown in FIG. 2 can be advantageously used in a device in accordance with the invention. This permutation network 116 is provided with four inputs 113.1, 113.2, 115.1 and 115.2. A first group of two data elements can be supplied to the permutation network 116 via the inputs 113.1 and 113.2. Similarly, a second group of two data elements can be supplied to the permutation network 116 via the inputs 115.1 and 115.2. These first and second groups of two data elements together form a first series of four data elements. The permutation network 116 farther comprises four outputs 117.1 through 117.4 for supplying a second series of four data elements. The permutation network 116 additionally includes four registers 120, 122, 132 and 134 and four multiplexers 124, 126, 128 and 130.

The permutation network 116 is capable of transforming two first series of four data elements, which are successively supplied to the inputs 113.1, 113.2, 115.1 and 115.2, into two second series of four data elements. If a first series of four data elements A-B-C-D is supplied to the inputs 113.1, 113.2, 115.1 and 115.2, i.e. data element A is supplied to input 113.1, data element B is supplied to input 113.2, data element C is supplied to input 115.1 and data element D is supplied to input 115.2, then the data elements A and C are stored, via the respective multiplexers 124 and 128, in the respective registers 132 and 134, and the data elements B and D are stored in the respective registers 120 and 122. If, subsequently, a first series of data elements E-F-G-H is supplied to the inputs 113.1, 113.2, 115.1 and 115.2, then, first of all, the data elements A and C stored in the registers 132 and 134 are exported via the respective outputs 117.1 and 117.2, and the data elements E and G supplied to the inputs 113.1 and 115.1 are exported via the respective multiplexers 126 and 130 and the respective outputs 117.3 and 117.4. At a later stage, the data elements B and D stored in the registers 120 and 122 are stored in the respective registers 132 and 134 via the respective multiplexers 124 and 128. Subsequently, the data elements F and H supplied via the inputs 113.2 and 115.2 are stored in the respective registers 120 and 122. Finally, the data elements B and D stored in the registers 132 and 134 are fed to the exterior via the respective outputs 117.1 and 117.2, while the data elements F and H stored in the registers 120 and 122 are exported via the respective multiplexers 126 and 130 and the respective outputs 117.3 and 117.4. In this manner, the two first series of data elements A-B-C-D and E-F-G-H are transformed by the permutation network 116 into two second series of data elements A-C-E-G and B-D-F-H.

The operation of the device in accordance with the invention will be explained in greater detail by means of the diagrams shown in FIGS. 4 and 5. These diagrams represent the contents of the memory means 110 at different instants, while the device shown in FIG. 1 carries out a 32-point radix-2 DFT algorithm as shown in FIG. 3. The digits to the right of the enframed part of a diagram give the sequence in which the series of data elements are read from the memory means 110. Double arrows to the right of the enframed part of a diagram indicate that the series of data elements indicated by the arrow heads must be exchanged.

In FIG. 4, the contents of the memory means 110 is shown at different instants, while the device shown in FIG. 1 carries out a 32-point radix-2 DFT, the sequence in which the series of input data elements are converted to series of output data elements being chosen so that multiplication factors necessary in the butterflies remain constant for as long as possible. The diagram 150 represents the initial contents of the memory means 110. The diagrams 160, 170, 180, 190 and 200 represent the contents of the memory means 110 after, respectively, the stages 0, 1, 2, 3 and 4 of the algorithms. After stage 4, the algorithm has been executed completely. The desired results are contained in the memory means 110, as indicated in diagram 200.

As indicated in the diagram 150, in stage 0 the device first reads the series of input data elements 0-1-2-3 from the memory means 110 and divides them into two groups of two input data elements 0-1 and 2-3. These two groups of two input data elements are subsequently converted in the radix-2 DFT butterflies 112 and 114 into two groups of two output data elements 0-1 and 2-3, whereafter these output data elements are stored in the permutation network 116. Subsequently, the device reads the series of input data elements 4-5-6-7 from the memory means 110 and divides them into two groups of two input data elements 4-5 and 6-7, which are converted in the radix-2 DFT butterflies 112 and 114 into two groups of two output data elements 4-5 and 6-7. In the permutation network 116, these output data elements and the output data elements already stored in said permutation network are divided into two series of four output data elements 0-2-4-6 and 1-3-5-7. The first series of four output data elements 0-2-4-6 must now be written in the memory. Since the memory means 110 can both read a series of four input data elements and write a series of four output data elements in a single clock cycle, it is possible to combine writing this first series of four output data elements 0-2-4-6 with reading the third series of four input data elements 8-9-10-11. Diagram 160 shows that the first series of four output data elements 0-2-4-6 is written in the memory means 110 at the location where, in diagram 150, the third series of input data elements 8-9-10-11 is read.

It is noted that in this treatise the assumption has been made that the conversion of the data elements in the butterflies 112 and 114 can take place within a single clock cycle. If this conversion takes longer than one clock cycle, writing the first series of output data elements 0-2-4-6 must be combined with reading another series of input data elements. For example, if the conversion takes a clock cycle, then writing of 0-2-4-6 can be combined with reading the fourth series of input data elements 12-13-14-15.

After reading the third series of input data elements 8-9-10-11 in combination with writing the first series of output data elements 0-2-4-6, reading the fourth series of input data elements 12-13-14-15 can be combined with writing the second series of output data elements 1-3-5-7. This process is continued in the manner described hereinabove for all eight series of output data elements in the sequence indicated in diagram 150. Since all series of input data elements have already been read, writing the seventh and eighth series of output data elements 24-26-28-30 and 25-27-29-31 cannot be combined, however, with reading series of input data elements.

As shown in the diagrams 160 and 170, in stage 1, writing the first and second series of output data elements 0-4-8-12 and 2-6-10-14 is combined with reading the third and fourth series of input data elements 16-18-20-22 and 24-26-28-30.However, unlike stage 0, in stage 1 the third and fourth series of output data elements 16-20-24-28 and 18-22-26-30 corresponding to these third and fourth series of input data elements are not combined with reading the fifth and sixth series of input data elements. These third and fourth series of output data elements are written at locations where the first and second series of input data elements are read. Similarly, in stage 1, writing the fifth and sixth series of output data elements 1-5-9-13 and 3-7-11-15 is combined with reading the seventh and eighth series of input data elements 17-19-21-23 and 25-27-29-31.The seventh and eighth series of output data elements 17-21-25-29 and 19-23-27-31 are written at locations where the fifth and sixth series of input data elements are read.

As shown in the diagrams 170 and 180, in stage 2, reading a series of input data elements is not once combined with writing a series of output data elements. Here, all series of output data elements are written at locations where the corresponding series of input data elements are read.

The diagrams 180 and 190 show that stage 3 is dealt with in the same manner as stage 0, except that, in stage 3, writing the seventh and eighth series of output data elements cannot be combined with reading series of input data elements.

Finally, stage 4 is dealt with in the same manner as stage 1.Here, the third and fourth series of output data elements are written at locations where the first and second series of input data elements are read. Similarly, the seventh and eighth series of output data elements are written at locations where the fifth and sixth series of input data elements are read.

The sequence of operations shown in FIG. 4 has the advantage that the multiplication factors necessary in the butterflies remain constant for as long as possible. As a result, these multiplication factors have to be read from a memory or calculated only a minimum number of times. The multiplication factors $W_N^k$ in question are given by the following formula:

$$W_N^k = e^{-j\frac{2\pi}{N}k}$$

where N represents the number of points to which the DFT process relates (in this example N is equal to 32), j is equal to $\sqrt{-1}$, and the parameter k will hereinafter be used to explain all this with reference to FIG. 4. The multiplication factors necessary for stage 0 are given by k=0 for all series of input data elements) The multiplication factors necessary for stage 1 are given by k=0 for the first four series of input data elements, while for the last four series, the multiplication factors are given by k=8. For, stage 2 the multiplication factors for the first and second series of input data elements are given by k=0, for the third and fourth series the multiplication factors are given by k=4, for the fifth and sixth series the multiplication factors are given by k=8, and for the seventh and eighth series, the multiplication factors are given by k=12. In stage 3, the multiplication factors for the first series of input data elements are given by k=0, for the second series by k=2, for the third series by k=4, for the fourth series by k=6, for the fifth series by k=8, for the sixth series by k=10, for the seventh series by k=12 and for the eighth series by k=14. In stage 0 through stage 3, the multiplication factors for the two butterflies 112 and 114 are always equal to each other. This is no longer the case in stage 4. In stage 4, the multiplication factors for the first series of input data elements are given by k=0 and k=1, for the second series by k=2 and k=3, for the third series by k=4 and k=5, for the fourth series by k=6 and k=7, for the fifth series by k=8 and k=9, for sixth series by k=10 and k=11, for the seventh series by k=12 and k=13 and for the eighth series by k=14 and k=15.

Figure 5:
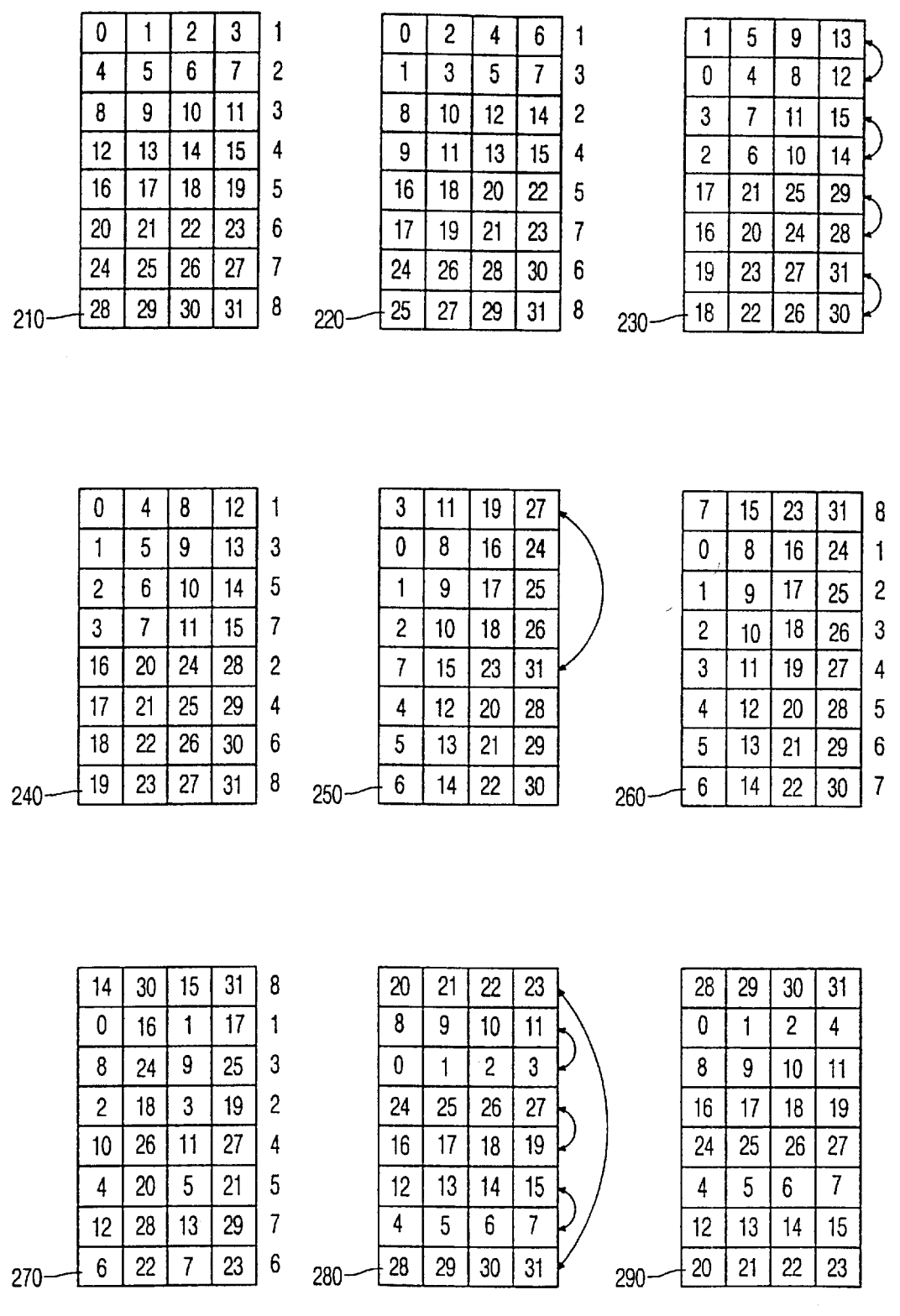

In FIG. 5, the contents of the memory means 110 is shown at different instants, while the device shown in FIG. 1 executes a 32-point radix-2 DFT, the sequence in which the series of input data elements are converted to series of output data elements being chosen so as to be different from that in FIG. 4. In FIG. 5, diagram 210 represents the initial contents of the memory means 10. The diagrams 220, 230, 250, 270 and 280 give the contents of the memory means 10 after, respectively, stage 0, 1, 2, 3 and 4 of the algorithm. The diagrams 240 and 260 give the contents of the memory means 10 before the start of, respectively, stage 2 and stage 3. After the algorithm has been executed, the results are contained in the memory means 10 as indicated in the diagram 290.

As shown in the diagrams 210 and 220, in stage 0, the device writes the series of output data elements at locations where the corresponding series of input data elements are read. For example, the series of output data elements 0-2-4-6 and 1-3-5-7 are written at locations where the corresponding series of input data elements 0-1-2-3 and 4-5-6-7 have been read.

In stage 1 (see diagrams 220 and 230), writing the first and second series of output data elements is combined with reading the third and fourth series of input data elements. Similarly, writing the fifth and sixth series of output data elements is combined with reading the seventh and eighth series of input data elements. The third and fourth series of output data elements, however, are written at locations where the first and second series of input data elements have been read. Similarly, the seventh and eighth series of output data elements are written at locations where the fifth and sixth series of input data elements have been read.

By exchanging the series of output data elements obtained in stage 1 in the manner indicated in diagram 230, it becomes possible to relatively easily determine, in stage 2, the addresses of the series of data elements to be read and written. The result of the exchanges is shown in diagram 240.

In stage 2 (see diagrams 240 and 250), writing the first and second series of output data elements is combined with reading the third and fourth series of input data elements. Similarly, writing the third and fourth series of output data elements is combined with reading the fifth and sixth series of input data elements, and writing the fifth and sixth series of output data elements is combined with reading the seventh and eighth series of input data elements. The seventh and eighth series of output data elements are written at locations where the first and second series of input data elements have been read. Also in this case, two series of data elements are exchanged for the same reasons as indicated hereinabove. The result thereof is shown in diagram 260.

In stage 3 (see diagrams 260 and 270), as in stage 0, the series of output data elements are written at locations where the corresponding series of input data elements have been read.

In stage 4 (see diagrams 270 and 280) the series of data elements are read and written in the same manner as in stage 1. Also in this case, a number of mutual exchanges of two series of data elements is performed. The result thereof is shown in the diagram 290.

The Table below gives an overview of the number of memory operations necessary to implement, for the various stages, the methods in accordance with FIGS. 4 and 5. In this Table, reading of a series of data elements, as well as writing of a series of data elements, and combined reading and writing of a series of data elements are each regarded as a single memory operation. An exchange of two series of data elements can be carried out by means of a read operation, a combined read/write operation and a write operation. Therefore, such an exchange comprises three memory operations.

TABLE

| Stage | Method in accordance with FIG. 4 | Method in accordance with FIG. 5 |
| --- | --- | --- |
| 0 | 10 | 16 |
| 1 | 12 | 24 |
| 2 | 16 | 13 |
| 3 | 10 | 16 |
| 4 | 12 | 24 |

The Table shows that the application of the method in accordance with FIG. 4 leads in most stages to a smaller number of memory operations than the method in accordance with FIG. 5. Only in stage 2, the opposite applies. By choosing the method which for each stage leads to a minimum number of memory operations, a reduction of the energy consumption by the device and an increase of the speed with which the device converts input data elements to output data elements can be achieved.

What is claimed is:

1. A device for converting a series of input data elements to series of output data elements, the device being provided with a memory means (110) for containing the series of input and output data elements, characterized in that the memory means (110) is controlled by a means for selecting an order in which to convert said input data elements to said output data elements, said means for selecting being programmed to select such order by grouping together input elements that, in order to be converted to output elements, require common multiplication factors, said means for selecting being further programmed to implement said conversion of said input data elements to said output data elements in said selected order.

2. A device of claim 1 wherein said input elements are stored in said memory means and wherein said memory means comprises means for being read from and written to in a single clock cycle.

3. The device of claim 2 wherein memory locations to which output data elements are written during a clock cycle are the same locations from which input data elements are read during said clock cycle.

4. The device of claim 3 further comprising a permutation means, the permutation means including a plurality of multiplexers having inputs and outputs, at least some of said multiplexers having outputs connected to storage registers, others having outputs connected to no such storage registers, the permutation means having permutation outputs that comprise partially outputs of said storage registers and partially outputs of said multiplexers, said device further comprising means for reading said permutation outputs.

5. The device of claim 4 comprising means programmed to perform a Viterbi algorithm.

6. The device of claim 4 comprising means programmed to perform a Fourier Transform.

7. The device of claim 4 wherein each multiplexer is connector to two inputs, one of said inputs being delayed by at least a clock cycle, and another of said inputs not being so delayed.

8. A method of converting input data elements to output data elements comprising the steps of:
   a. dividing a first group of input data elements into two first subgroups of input data elements, and converting the two first subgroups of input data elements into two first subgroups of output data elements;
   b. dividing a second group of input data elements into two second subgroups of input data elements, and converting the two second subgroups of input data elements into two second subgroups of output data elements; and
   c. storing at least one of said first subgroups of output data elements and at least one of said second subgroups of said output data elements in storage locations previously storing a third group of input data elements, and during a clock cycle in which said third group of input data elements is read.

9. The method of claim 8 further comprising storing at least another of said first subgroups of output data elements and at least another of said second subgroups of said output data elements in storage locations previously storing a fourth group of input data elements, and during a clock cycle in which said fourth group of input data elements is read.

10. The method of claim 8 further comprising repeating steps a, b, and c, for said third and fourth groups of said input data elements and for a fifth group of said input data elements.

11. The method of claim 10 comprising converting said input data elements in an order such that conversions requiring common multipliers are performed sequentially, thereby minimizing a number of times coefficients must be calculated or retrieved.

12. The method of claim 11 comprising converting said input data elements using a Viterbi algorithm.

13. The method of claim 12 comprising converting said input data elements using a Fourier Transform algorithm.

* * * * *